(12) United States Patent
Elias et al.

(10) Patent No.: US 7,940,784 B2
(45) Date of Patent: May 10, 2011

(54) METHODS AND APPARATUS TO ADVERTISE NETWORK ROUTES TO IMPLEMENT A HYBRID NETWORK TOPOLOGY

(75) Inventors: Mark Elias, Eastpointe, MI (US); Sherry Soja-Molloy, Taylor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 75 days.

(21) Appl. No.: 12/263,826

(22) Filed: Nov. 3, 2008

(65) Prior Publication Data

US 2010/0110928 A1    May 6, 2010

(51) Int. Cl.
*H04L 12/28* (2006.01)
(52) U.S. Cl. ......................... 370/406; 370/396
(58) Field of Classification Search .............. 370/400, 370/401, 254, 252, 253, 255, 406, 407, 408, 370/419, 420, 352, 356, 351; 709/203, 229
See application file for complete search history.

(56) References Cited

U.S. PATENT DOCUMENTS

| | | | |
|---|---|---|---|
| 7,359,377 B1 | 4/2008 | Kompella et al. | |
| 7,366,894 B1 | 4/2008 | Kalimuthu et al. | |
| 7,400,611 B2 | 7/2008 | Mukherjee et al. | |
| 7,698,456 B2 * | 4/2010 | Guichard et al. | 709/238 |
| 2002/0181477 A1 * | 12/2002 | Mo et al. | 370/401 |
| 2005/0025069 A1 * | 2/2005 | Aysan | 370/254 |
| 2006/0029032 A1 * | 2/2006 | Allan et al. | 370/351 |
| 2006/0029035 A1 | 2/2006 | Chase et al. | |
| 2006/0039364 A1 | 2/2006 | Wright | |
| 2006/0206606 A1 | 9/2006 | Iloglu et al. | |
| 2006/0230444 A1 | 10/2006 | Iloglu et al. | |
| 2007/0177596 A1 | 8/2007 | Bapat et al. | |
| 2008/0049645 A1 | 2/2008 | Singh et al. | |
| 2008/0170580 A1 | 7/2008 | Goldman et al. | |
| 2008/0192762 A1 | 8/2008 | Kompella et al. | |
| 2008/0232379 A1 * | 9/2008 | Mohamed et al. | 370/395.53 |
| 2009/0157901 A1 * | 6/2009 | Asati et al. | 709/238 |

OTHER PUBLICATIONS

Rosen et al., "BGP/ MPLS IP Virtual Private Networks (VPNs)," RFC 4364, Network Working Group, Feb. 2006, 48 pages [retrieved from http://tools.ietf.org/html/rfc4364].

Van Der Merwe et al., "Dynamic Connectivity Management with an Intelligent Route Service Control Point," AT&T Labs, 6 pages.

Sangli et al., "BGP Extended Communities Attribute," RFC 4360, Network Working Group, Feb. 2006, 13 pages [retrieved from http://tools.ietf.org/html/rfc4360].

Bates et al., "BGP Route Reflection: An Alternative to Full Mesh Internal BGP (IBGP)," RFC 4456, Network Working Group, Apr. 2006, 13 pages [retrieved from http://tools.ietf.org/html/rfc4456].

(Continued)

*Primary Examiner* — Hanh Nguyen
(74) *Attorney, Agent, or Firm* — Hanley, Flight & Zimmerman, LLC (57) ABSTRACT

Example methods and apparatus to advertise network routes to implement a hybrid network topology are disclosed. An example method involves receiving a route advertisement from a first node and identifying a first destination internet protocol address associated with the route advertisement. When the first destination internet protocol address matches a second destination internet protocol address, the route advertisement is associated with a first route target value equal to an import route target value of a second node. The first network node is a first spoke node in a hub-and-spoke network, and the second network node is a second spoke node in the hub-and-spoke network.

19 Claims, 6 Drawing Sheets

OTHER PUBLICATIONS

Kompella et al., "Virtual Private LAN Service (VPLS) Using BGP for Auto-Discovery and Signaling," RFC 4761, Network Working Group, Jan. 2007, 29 pages [retrieved from http://tools.ietf.org/html/rfc4761].

Rosen et al., "BGP/ MPLS VPNs," RFC 2547, Network Working Group, Mar. 1999, 26 pages [retrieved from http://www.rfc-editor.org/rfc2547.txt].

* cited by examiner

POLICY DATA STRUCTURE

| RECORD KEY | IP ADDRESSES APPROVED FOR ANY-TO-ANY COMMUNICATION PATHS |
|---|---|
| 1 | 72.245.158.1 |
| 2 | 72.245.162.125 |
| 3 | 125.127.68.32 |
| 4 | 129.101.25.3 |
| 5 | 154.125.8.201 |

METHODS AND APPARATUS TO ADVERTISE NETWORK ROUTES TO IMPLEMENT A HYBRID NETWORK TOPOLOGY

FIELD OF THE DISCLOSURE

The present disclosure relates generally to communication systems and, more particularly, to methods and apparatus to advertise network routes to implement a hybrid network topology.

BACKGROUND

Network service providers enable data communication services using networks having different network topologies. An any-to-any network topology (also known as a mesh network topology) is a network architecture in which each node has a connection to all other nodes. A hub-and-spoke network topology (also known as a star network topology) is a network architecture in which a central hub makes and breaks connections between different nodes, each on a separate spoke. In some network implementations, the any-to-any topology is often used to communicate synchronous or isochronous information such as voice over IP (VOIP) communications or other real-time information that is timing critical for purposes of quality, while the hub-and-spoke topology is often used to communicate information that is less timing critical such as data.

A multi-protocol label switching (MPLS) network is an example network that can be implemented using an any-to-any topology or a hub-and-spoke topology. Data is communicated using these network topologies based on route advertisements flooded into the network by different nodes using route target (RT) values. A node's ability to receive a route advertisement depends on whether its assigned import RT value matches the RT value of the route advertisement. MPLS networks are often used to establish virtual private network (VPN) connections. To establish a VPN using an any-to-any mesh network, the same RT value is assigned to every node in that particular VPN. In this manner, when a node publishes a route advertisement, all other nodes can receive the route advertisement. To establish a VPN using a hub-and-spoke network, each hub node is provided an export RT value and a different import RT value, while each spoke node is provided an import RT value equal to the export RT value of the hub nodes and an export RT value equal to the import RT value of the hub nodes. In this manner, when a spoke node publishes a route advertisement, only hub nodes can receive it for use in managing connections between different spoke nodes.

In known systems, if a particular party desires to use both an any-to-any mesh network topology for some data and a hub-and-spoke network topology for other data, two separate VPNs must be created. In such an instance, a first VPN is formed using an any-to-any mesh network topology, and a second VPN is formed using a hub-and-spoke network.

DETAILED DESCRIPTION

The example methods and apparatus described herein may be used to implement a multi-protocol label switching (MPLS) network topology in a hybrid fashion so that networks having a hub-and-spoke topology can also be used in an any-to-any communication fashion. In this manner, networks ordinarily configured using a hub-and-spoke topology for data communications can also be used in an any-to-any communication fashion to, for example, enable VOIP communications or other synchronous or isochronous communications while ensuring acceptable real-time or near real-time quality.

Figure 1:
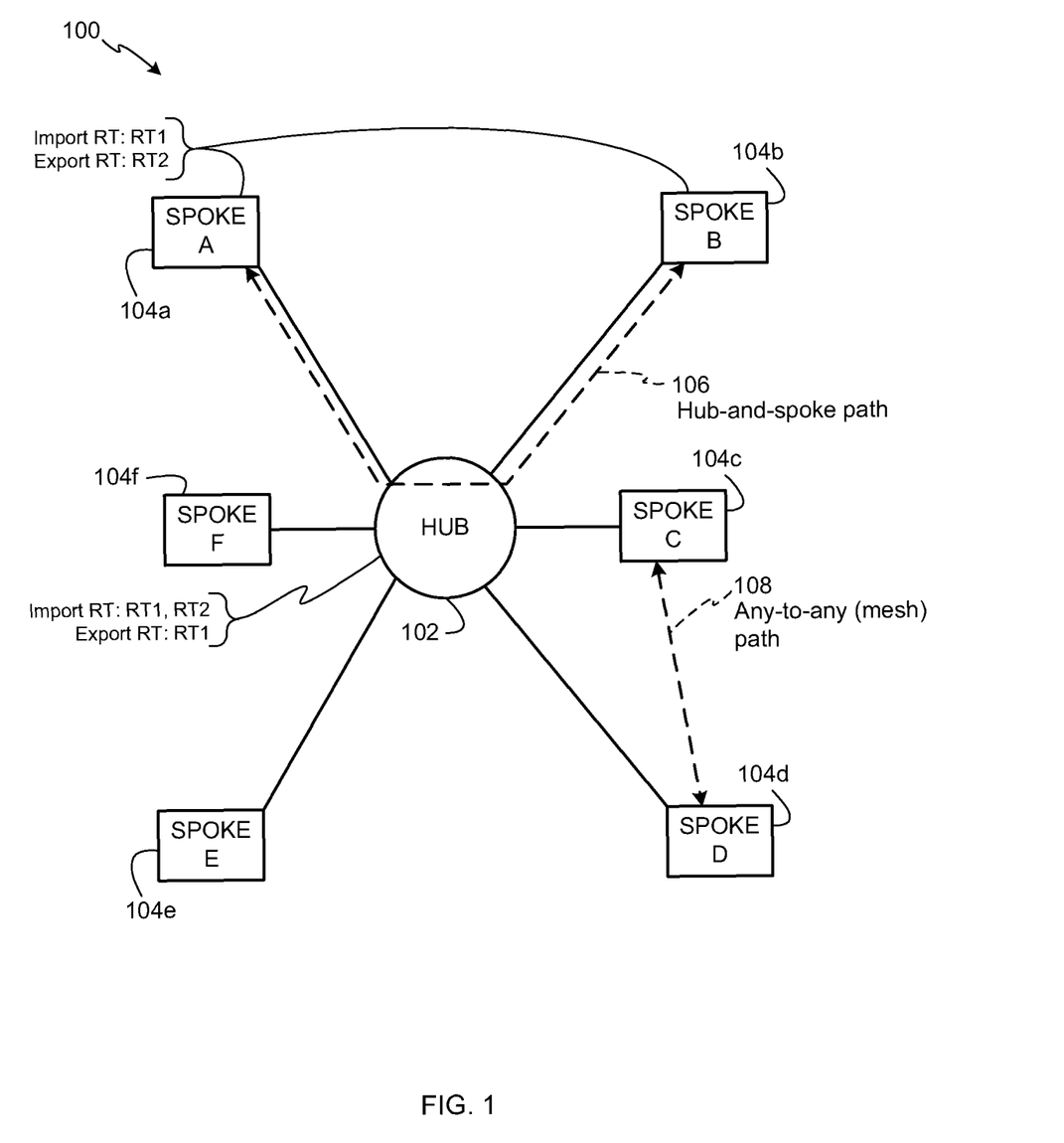
FIG. 1 is an example hub-and-spoke network.

Turning to FIG. 1, an example hub-and-spoke network 100 includes a hub node 102 communicatively coupled to a plurality of spoke nodes A-F 104*a-f*. Traditionally, a hub node of a hub-and-spoke network makes and breaks connections between different spokes. For example, as shown in FIG. 1, the hub node 102 can establish and maintain a hub-and-spoke communication path 106 between the spoke nodes A 104*a* and B 104*b*. The methods and apparatus described herein are configured to enable hub-and-spoke communication paths such as the path 106 and also to enable direct communication paths between different spoke nodes without requiring involvement of a hub node. For example, as is also depicted in FIG. 1, the methods and apparatus described herein can be used to establish an any-to-any communication path 108 between spoke nodes C 104*c* and D 104*d*.

Whether information can be communicated via particular routes in a network depends on whether those routes are available. Availabilities of routes are made known to different nodes of a network via route advertisements (RAs). That is, when one node becomes aware of an available route or is itself part of an available route, it advertises that route via a route advertisement. In this manner, those available routes can be used to communicate information when a need arises. In a traditional hub-and-spoke network, hub-and-spoke communication paths, such as the communication path 106 of FIG. 1, are constrained to being established, maintained, and broken down by hubs, while spoke nodes communicate requests to the hubs for communication paths. Thus, in a traditional hub-and-spoke network, route advertisements published by spoke nodes are only seen by hubs, and are not seen by other spoke nodes.

Visibility of route advertisements by different network entities, such as the hub node 102 and the spoke nodes 104*a-f*, is controlled through the use of route target (RT) attributes stored in fields of the route advertisements. In traditional hub-and-spoke networks and the hub-and spoke network 100 shown in FIG. 1, hub nodes and spoke nodes are configured with different import and export RT attributes to control their ability to see route advertisements. In the illustrated example of FIG. 1, the hub node 102 is provided with import RT attributes RT1 and RT2 and an export RT attribute of RT1. That is, the hub node 102 can receive or import route advertisements having RT1 or RT2 route target identifiers and can export route advertisements using the RT1 route target identifier. Also shown in FIG. 1, the spoke nodes 104a-f can receive or import route advertisements having the RT1 route target identifier and export route advertisements using the RT2 route target identifier. Therefore, route advertisements published by the hub node 102 using the RT1 export route target identifier can be seen by the spoke nodes 104a-f and other hub nodes (not shown) because they are all configured to use RT1 as an import route target identifier. However, route advertisements published by the spoke nodes 104a-f using the RT2 route target identifier can ordinarily only be seen by the hub node 102 because, while the hub node 102 is also configured to use RT2 as an import route target identifier, the spoke nodes 104a-f are only configured to use RT1 as an import route target identifier. As discussed below, the methods and apparatus described herein can be used to add route target identifiers to route advertisements based on predetermined policies to enable visibility of route advertisements to nodes that would otherwise not be able to view those route advertisements due to the route target identifiers of the route advertisements not matching the import route target attributes assigned to those nodes.

Figure 2:
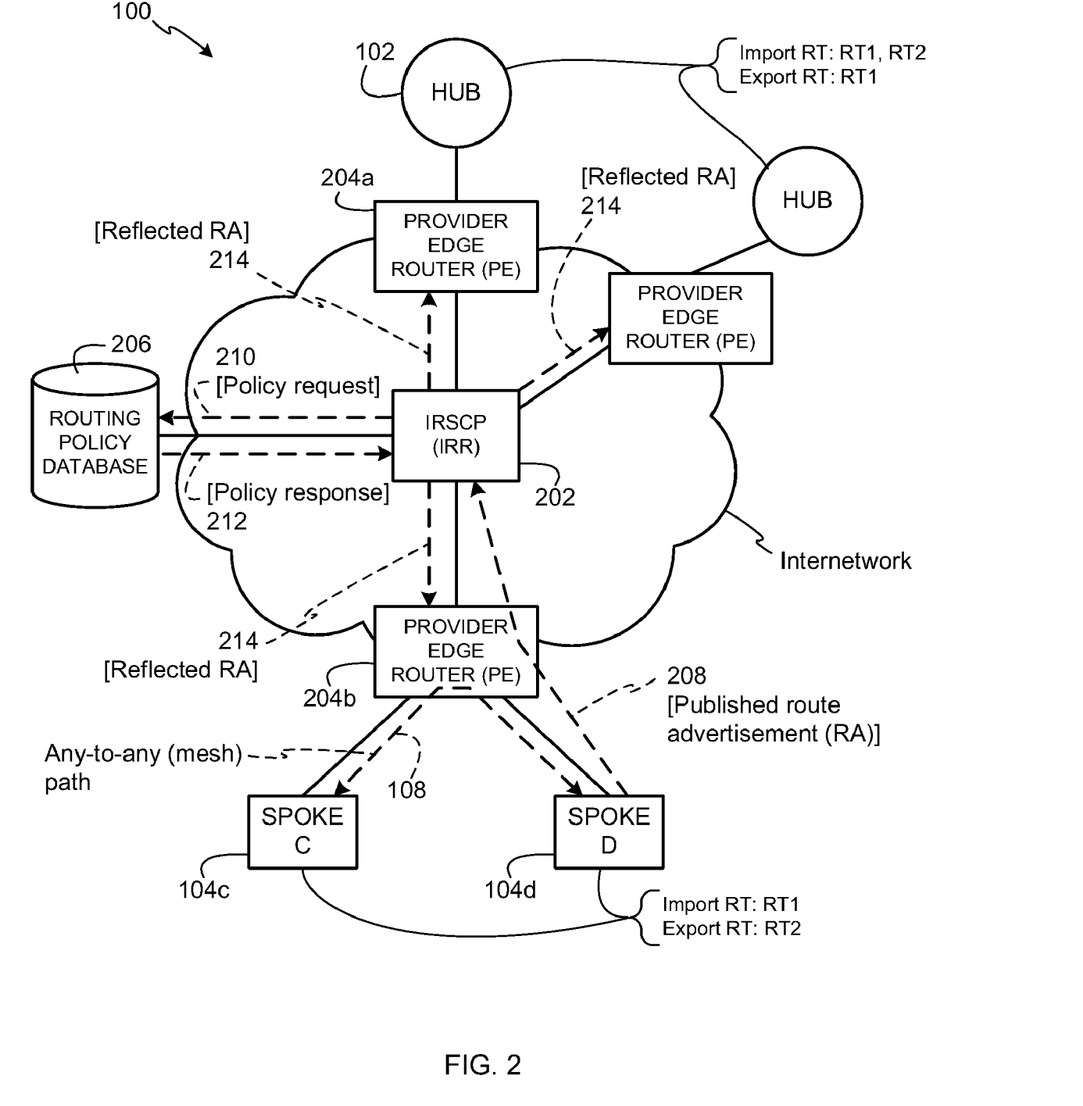
FIG. 2 is a detailed illustration of the example hub-and-spoke network of FIG. 1 showing an intelligent route service control point and a routing policy database.

Turning now to FIG. 2, the example hub-and-spoke network 100 is shown in greater detail. In the illustrated example, the hub-and-spoke network 100 includes an intelligent route service control point (IRSCP) (or an intelligent route reflector (IRR)) 202 communicatively coupled to the hub node 102 via a provider edge router (PE) 204a and to the spoke nodes C 104c and D 104d via a PE 204b. The IRSCP 202 is also coupled to a routing policy database 206. In the illustrated example, the IRSCP 202 is configured to receive published route advertisements from nodes and reflect those route advertisements onto other nodes based on rules or policies stored in the routing policy database 206.

Figure 3:
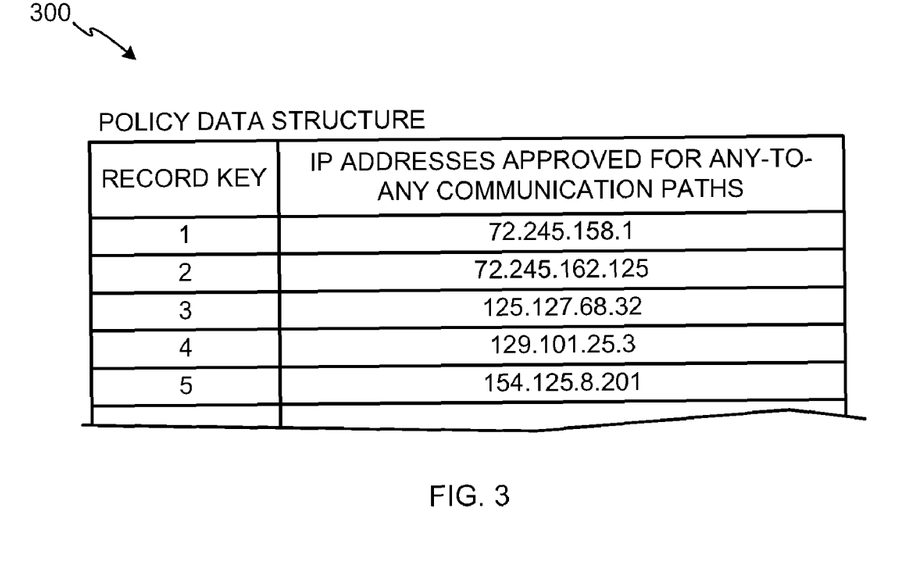
FIG. 3 is an example policy data structure that may be used to store internet protocol addresses approved for communications using any-to-any (mesh) network communication paths.

In the illustrated example, the rules or policies stored in the routing policy database 206 are implemented using a table storing destination IP addresses that are authorized for communications via any-to-any network connections. In this manner, when the IRSCP 202 receives a published route advertisement associated with a particular IP address, the IRSCP 202 can query the routing policy database 206 to determine whether the published route advertisement should be reflected as an any-to-any route. Turning briefly to FIG. 3, an example policy data structure 300 is implemented using a destination IP address table that can be used to store destination IP addresses in the routing policy database 206. The example policy data structure 300 is shown as having a plurality of destination IP addresses approved for communications using any-to-any (mesh) network communication paths.

Returning to FIG. 2, an example implementation of a route advertisement publishing and reflecting process in accordance with the example methods and apparatus described herein is shown by way of example. As shown, spoke node D 104d communicates or publishes a route advertisement 208 to the PE 204b, which in turn communicates the published route advertisement 208 to the IRSCP 202. Although the route advertisement 208 is shown as being published by a spoke node, the example methods and apparatus described herein can also be used in connection with route advertisements published by hub nodes.

When the IRSCP 202 receives the published route advertisement 208, it queries the routing policy database 206 using a policy request query 210 regarding the destination IP address of the published route advertisement 208. The routing policy database 206 then searches its stored destination IP addresses to determine whether any of the destination IP addresses stored therein match the destination IP address of the published route advertisement 208.

If the routing policy database 206 finds a match between an IP address in its stored destination IP address table and the destination IP address of the published route advertisement 208, the routing policy database 206 sends a policy response 212 to the IRSCP 202 indicating that the published route advertisement 208 can be reflected or flooded to other nodes as corresponding to an any-to-any route. To reflect the published route advertisement 208 on the network 100 as corresponding to an any-to-any route in the illustrated example, the IRSCP 202 adds an export route target identifier of RT1 to the published route advertisement 208 to render the route advertisement visible to other spoke nodes configured with an import route target of RT1. The IRSCP 202 then reflects or floods the route advertisement to other nodes via reflected route advertisements 214. In this manner, when the reflected route advertisements 214 reach the spoke nodes having an import route target of RT1, the spoke nodes can become aware of the available route advertised by spoke node D 104d and can connect with spoke node D 104d while bypassing the hub node 102 to form an any-to-any connection such as the any-to-any (mesh) communication path 108.

However, if the routing policy database 206 does not find a match between an IP address in its stored destination IP address table and the destination IP address in the published route advertisement 208, that particular destination IP address is not approved for communications using any-to-any connections. In such a case, the policy response 212 to the IRSCP 202 indicates that the IRSCP 202 should reflect the published route advertisement 208 on the network 100 without adding the route target identifier RT1 to it. In this manner, only hub nodes will be able to see the reflected route advertisements 214 so that connections using that destination IP address indicated in the reflected route advertisements 214 will be formed using hub-and-spoke connections.

Figure 4:
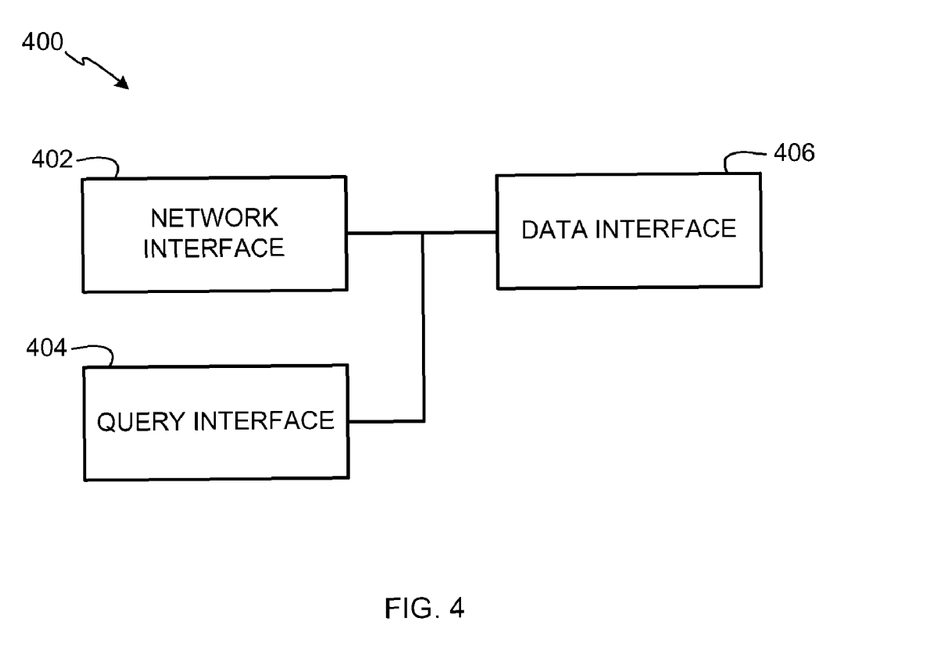
FIG. 4 is a block diagram of an example apparatus that may be used to implement an intelligent route service control point of the example network of FIGS. 1 and 2.

FIG. 4 is a block diagram of an example apparatus 400 that may be used to implement the IRSCP 202 of FIG. 2. In the illustrated example, the example apparatus 400 includes a network interface 402, a query interface 404, and a data interface 406. The example apparatus 400 may be implemented using any desired combination of hardware, firmware, and/or software. For example, one or more integrated circuits, discrete semiconductor components, and/or passive electronic components may be used. Thus, for example, any of the network interface 402, the query interface 404, and/or the data interface 406, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 7:
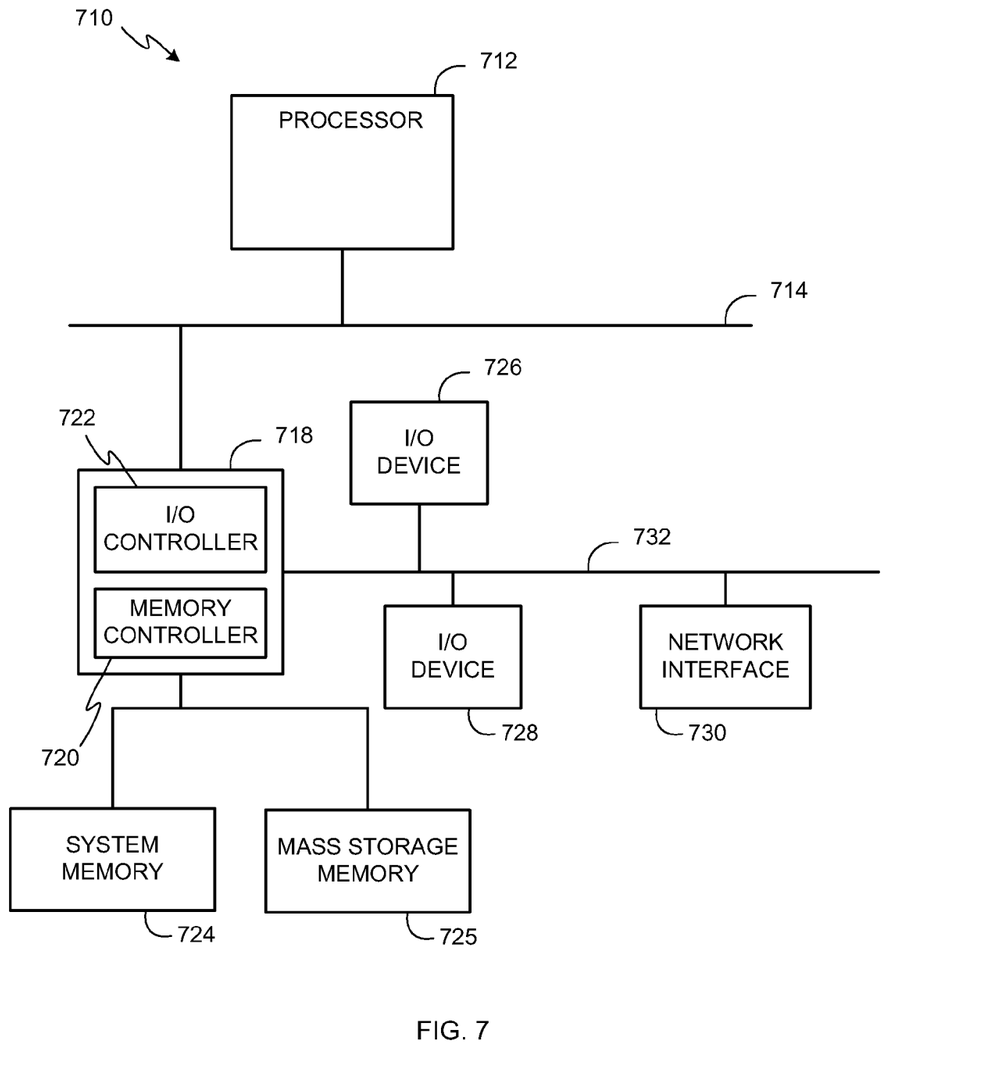
FIG. 7 is a block diagram of an example processor system that may be used to execute the example machine readable instructions of FIGS. 5 and/or 6 to implement the example apparatus of FIG. 4 and/or the example routing policy database of FIG. 2.

Some or all of the network interface 402, the query interface 404, and/or the data interface 406, or parts thereof, may be implemented using instructions, code, and/or other software and/or firmware, etc. stored on a machine accessible medium and executable by, for example, a processor system (e.g., the example processor system 710 of FIG. 7). When any of the appended claims are read to cover a purely software implementation, at least one of the network interface 402, the query interface 404, and/or the data interface 406 is hereby expressly defined to include a tangible medium such as a memory, DVD, CD, etc.

The example apparatus 400 is provided with the network interface 402 to receive published route advertisements, such as the published route advertisement 208 of FIG. 2. In addition, the network interface 402 can reflect or flood route advertisements onto a network. For example, the network interface 402 can reflect or flood the network 100 with the reflected route advertisements 214.

The example apparatus 400 is provided with the query interface 404 to generate queries regarding whether route advertisements can be reflected or flooded as corresponding to any-to-any communication paths. In addition, the query interface 404 is configured to receive responses corresponding to its queries. In the illustrated example of FIG. 2, the query interface 404 can generate the policy request query 210 and communicate it to the routing policy database 206 to determine whether the destination IP address of the published route advertisement 208 is approved for use in connection with any-to-any (mesh) communication paths. In addition, the query interface 404 can receive the policy response 212 from the routing policy database 206.

The example apparatus 400 is provided with the data interface 406 to add route target identifiers to route advertisements. For example, in the illustrated example of FIG. 2, the data interface 406 can add the route target identifier of RT1 to the published route advertisement 208 if the routing policy database 206 indicates that one of its stored destination IP addresses matches the destination IP address of the published route advertisement 208.

Figure 5:
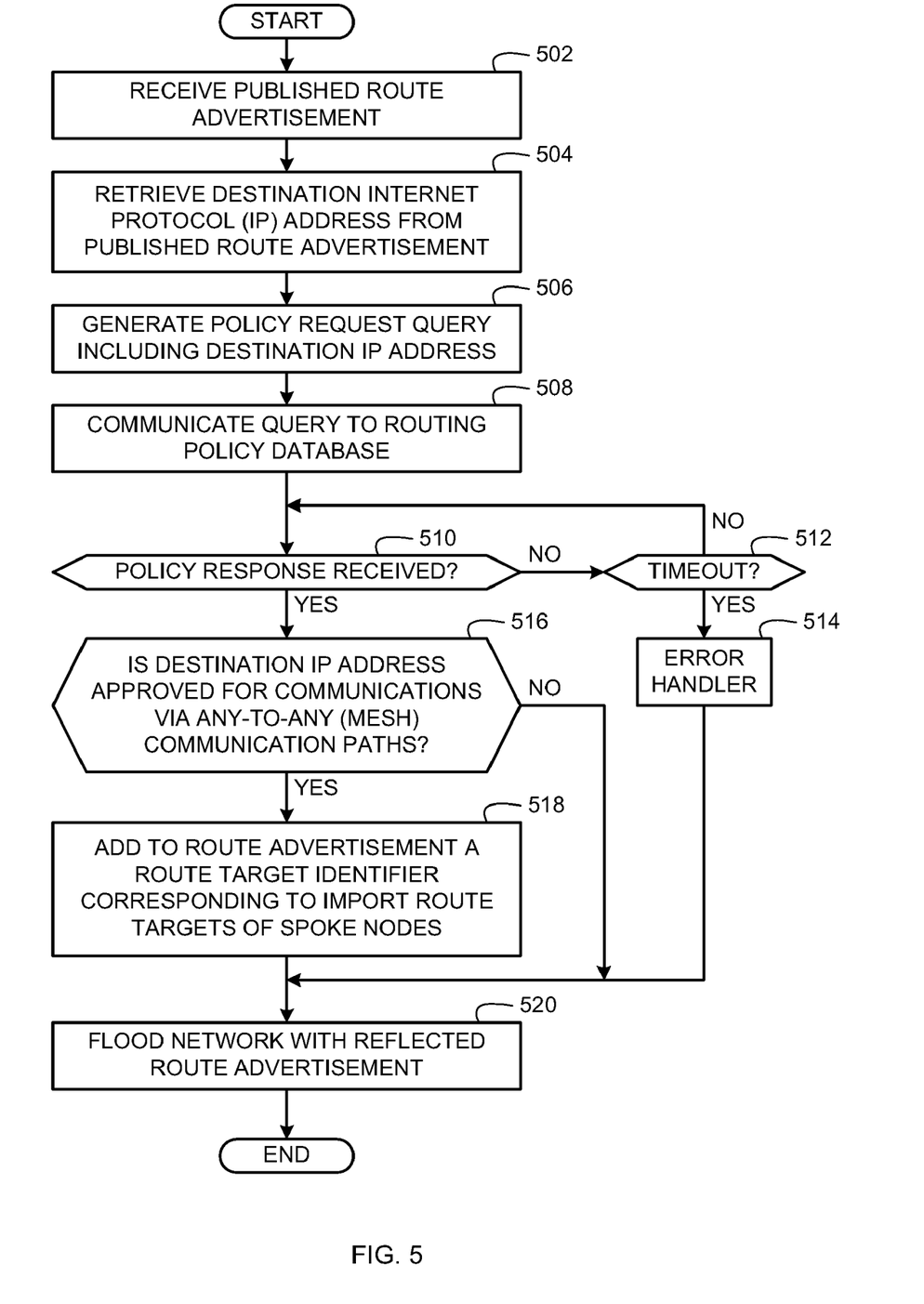
FIG. 5 is a flowchart representative of example machine readable instructions that may be executed to implement the example apparatus of FIG. 4.
Figure 6:
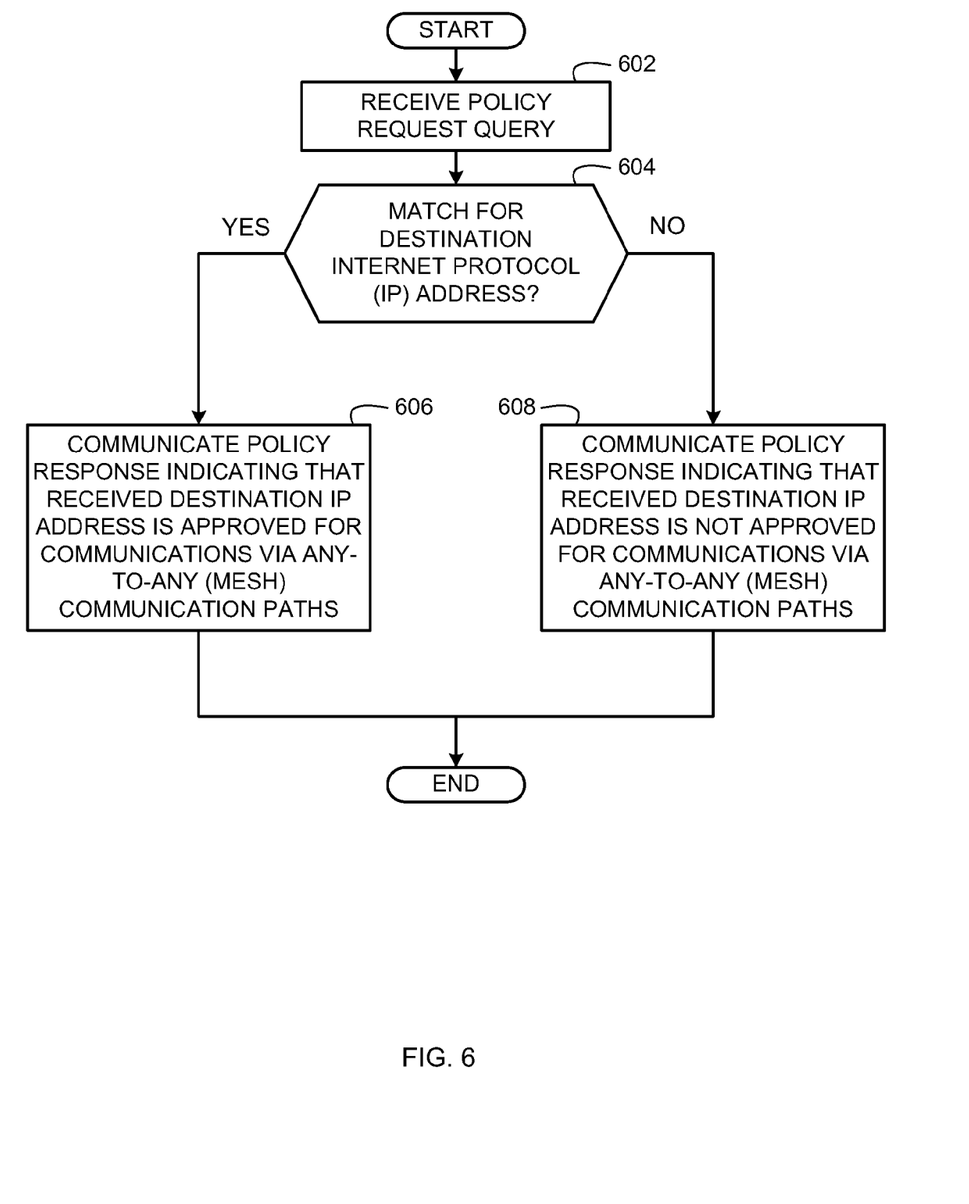
FIG. 6 is a flowchart representative of example machine readable instructions that may be executed to implement the example routing policy database of FIG. 2.

FIG. 5 is a flowchart representative of example machine readable instructions that may be executed to implement the example apparatus of FIG. 4 to reflect or flood route advertisements onto a network in accordance with policies associated with establishing hub-and-spoke communication paths and any-to-any (mesh) network communication paths between different network nodes. FIG. 6 is a flowchart representative of example machine readable instructions that may be executed to implement the routing policy database 206 of FIG. 2 to communicate information to the IRSCP 202 regarding routing policies associated with different destination IP addresses. The example processes of FIGS. 5 and 6 may be performed using a processor, a controller, and/or any other suitable processing device. For example, the example processes of FIGS. 5 and 6 may be implemented in coded instructions stored on a tangible medium such as a flash memory, a read-only memory (ROM), and/or a random-access memory (RAM) associated with a processor (e.g., the example processor 712 discussed below in connection with FIG. 7). Alternatively, one or both of the example processes of FIGS. 5 and 6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or both of the example processes of FIGS. 5 and 6 may be implemented manually or as any combination(s) of any of the foregoing techniques, for example, any combination of firmware, software, discrete logic and/or hardware. Further, although the example processes of FIGS. 5 and 6 are described with reference to the flow diagrams of FIGS. 5 and 6, other methods of implementing the processes of FIGS. 5 and 6 may be employed. For example, the order of execution of the blocks may be changed, and/or some of the blocks described may be changed, eliminated, sub-divided, or combined. Additionally, one or both of the example processes of FIGS. 5 and 6 may be performed sequentially and/or in parallel by, for example, separate processing threads, processors, devices, discrete logic, circuits, etc.

Turning to FIG. 5, initially the network interface 402 (FIG. 4) receives the published route advertisement 208 of FIG. 2 (block 502). In some examples, the route advertisement is received via a route reflector. The data interface 406 (FIG. 4) retrieves the destination IP address from the published route advertisement 208 (block 504). For example, the data interface 406 can locate a field in the published route advertisement 208 that stores the destination IP address and copy the destination IP address from that field.

The query interface 404 (FIG. 4) generates the policy request query 210 (FIG. 2) (block 506). For example, the query interface 404 can write the retrieved destination IP address in the policy request query 210 as a search criterion for use by the routing policy database 206 in searching for a matching IP address in its destination IP address table. In addition, the query interface 404 communicates the policy request query 210 to the routing policy database 206 (FIG. 2) (block 508). The query interface 404 determines whether it has received the policy response 212 (FIG. 2) from the routing policy database 206 (block 510). If the query interface 404 determines that it has not received the policy response 212, the query interface 404 determines whether a timeout period has expired (block 512). For example, a timeout period may be pre-set to an amount of time that the query interface 404 should wait to receive a response from the routing policy database 206 before timing out. If the timeout period has not expired (block 512), the query interface 404 continues to wait for the policy response 212. Otherwise, if the timeout period has expired the example apparatus 400 executes an error handler (block 514). For example, the error handler may involve retransmitting the policy request query 210 to the routing policy database 206 or aborting the query.

If at block 510, the query interface 404 receives the policy response 212, the query interface 404 determines whether the destination IP address of the published route advertisement 208 is approved for communications via any-to-any (mesh) communication paths (block 516). For example, if the routing policy database 206 finds a match between one of its stored destination IP addresses and the destination IP address of the published route advertisement 208, the routing policy database 206 can communicate a true flag to the query interface 404 or a parameter value equal to the destination IP address or any other information indicating that the destination IP address is approved for communications using any-to-any (mesh) communication paths. However, if the routing policy database 206 does not find a match, it can communicate a false flag or a parameter value equal to zero or null or any other information indicating that the destination IP address is not approved for communications using any-to-any (mesh) communication paths.

If the query interface 404 determines based on the policy response 212 that the destination IP address of the published route advertisement 208 is approved for communications via any-to-any (mesh) communication paths (block 516), the data interface 406 adds to the published route advertisement 208 a route target identifier corresponding to the import route targets of spoke nodes. For example, in the illustrated example of FIG. 2, the data interface 406 would write the route target identifier of RT1 to the published route advertisement 208 to enable the spoke nodes 104a-f in addition to other hub nodes to view the subsequently reflected route advertisements 214 based on the matching import route target identifiers assigned to those nodes.

If, instead, the query interface 404 determines based on the policy response 212 that the destination IP address of the published route advertisement 208 is not approved for communications using any-to-any (mesh) communication paths (block 516), then the data interface 406 does not add to the published route advertisement 208 the route target identifier corresponding to the import route targets of spoke nodes. In this manner, only hub nodes and not spoke nodes would be able to receive the subsequently reflected route advertisements 214.

After the addition of the route target identifier at block 518 or after block 516 if a route identifier was not added or if the error handler operation of block 514 aborts the query, the network interface 402 floods or reflects the reflected route advertisements 214 to the network 100 (block 520). In this manner, if the data interface 406 added the route target identifier at block 518 corresponding to import route target identifiers assigned to spoke nodes, spoke nodes and hub nodes would receive the reflected route advertisements 214, whereas if the data interface 406 had not added the route target identifier at block 518, then only the hub nodes would receive the reflected route advertisements 214. After the network interface 402 floods the network (block 520), the example process of FIG. 5 is ended.

Turning now to FIG. 6, the illustrated example process can be used to implement the routing policy database 206 of FIG. 2. Initially, the routing policy database 206 receives the policy request query 210 (FIG. 2) (block 602) via, for example, a communications interface (not shown). The routing policy database 206 determines whether any destination IP address stored in the policy data structure 300 of FIG. 3 matches the destination IP address received via the policy request query 210 (block 604). For example, the routing policy database 206 can perform a search in the policy data structure 300 to find a match using, for example, a search interface or a comparator (not shown).

If the routing policy database 206 determines that there is a match (block 604), the routing policy database 206 communicates the policy response 212 (FIG. 2) to the IRSCP 202 (FIG. 2) indicating that the received destination IP address is approved for communications via any-to-any (mesh) communication paths (block 606). Otherwise, if the routing policy database 206 determines that there is not a match (block 604), the routing policy database 206 communicates the policy response 212 to the IRSCP 202 indicating that the received destination IP address is not approved for communications via any-to-any (mesh) communication paths (block 608). In this manner, the IRSCP 202 can use the policy response 212 to process a route advertisement as described above in connection with blocks 516, 518, and 520 of FIG. 5. After the routing policy database 206 communicates the policy response 212 to the IRSCP, the example process of FIG. 6 is ended.

FIG. 7 is a block diagram of an example processor system 710 that may be used to implement the example apparatus, methods, and articles of manufacture described herein. For example, processor systems substantially similar or identical to the example processor system 710 may be used to implement the hub node 102, the spoke nodes 104*a-f*, the IRSCP 202, the provider edge routers 204*a-b*, and/or the routing policy database 206, all of FIGS. 1 and/or 2. In addition, processor systems substantially similar or identical to the example processor system 710 may be used to implement the network interface 402, the query interface 404, and/or the data interface 406 of the example apparatus 400 of FIG. 4.

As shown in FIG. 7, the processor system 710 includes a processor 712 that is coupled to an interconnection bus 714. The processor 712 may be any suitable processor, processing unit, or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. A chipset provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a digital subscriber line (DSL) modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. Accordingly, the example software and/or firmware described herein can be stored on a tangible medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method of advertising network routes, comprising:
   receiving a route advertisement from a first spoke node of a hub-and-spoke network;
   identifying a first destination internet protocol address associated with the route advertisement, the first destination internet protocol address corresponding to a second spoke node of the hub-and-spoke network; and
   when the first destination internet protocol address matches a stored destination internet protocol address thereby indicating that the second spoke node is authorized for mesh communications, adding, via a processor, an export route target value equal to an import route target value of the second spoke node to the route advertisement.

2. A method as defined in claim 1, wherein the stored destination internet protocol address is stored in a policy data structure to store a plurality of destination internet protocol addresses approved for communications via mesh network communication paths.

3. A method as defined in claim 1, wherein receiving the route advertisement from the first node comprises, receiving the route advertisement via a route reflector.

4. A method as defined in claim 1, further comprising communicating the first destination internet protocol address to a database and receiving a policy response from the database indicating whether the first destination internet protocol address matches the stored destination internet protocol address.

5. A method as defined in claim 1, further comprising flooding a network with the route advertisement including the first export route target value equal to the import route target value of the second spoke node.

6. A method as defined in claim 1, wherein the second spoke node is prohibited from receiving the route advertisement without the addition of the export route target value to the route advertisement.

7. An apparatus to advertise network routes, the apparatus comprising:
   a network interface to receive a route advertisement from a first spoke node of a hub-and-spoke network; and
   a data interface to identify a first destination internet protocol address associated with the route advertisement, the first destination internet protocol address corresponding to a second spoke node of the hub-and-spoke network, the data interface to add an export route target value equal to an import route target value of the second spoke node to the route advertisement when the first destination internet protocol address matches a stored destination internet protocol address thereby indicating that the second spoke node is authorized for mesh communications.

8. An apparatus as defined in claim 7, further comprising a policy data structure to store the stored destination internet protocol address and a plurality of destination internet protocol addresses approved for communications via mesh network communication paths.

9. An apparatus as defined in claim 7, wherein the network interface is to receive the route advertisement from the first node for a route reflector.

10. An apparatus as defined in claim 7, further comprising a query interface to determine whether the first destination internet protocol address matches the stored destination internet protocol address based on information received from a routing policy database.

11. An apparatus as defined in claim 7, further comprising a query interface to communicate the first destination internet protocol address to a routing policy database, the query interface to receive a policy response from the routing policy database indicating whether the first destination internet protocol address matches a second destination internet protocol address.

12. An apparatus as defined in claim 7, wherein the network interface is to flood a network with the route advertisement including the export route target value equal to the import route target value of the second spoke node.

13. An apparatus as defined in claim 7, wherein the second spoke node is prohibited from receiving the route advertisement without the addition of the export route target value to the route advertisement.

14. A tangible machine accessible medium having instructions stored thereon that, when executed, cause a machine to at least:
   receive a route advertisement from a first spoke node of a hub-and-spoke network;
   identify a first destination internet protocol address associated with the route advertisement, the first destination internet protocol address corresponding to a second spoke node of the hub-and-spoke network; and
   when the first destination internet protocol address indicates that the second spoke node is authorized for mesh communications by matching a second destination internet protocol address stored in an authorization database, add to the route advertisement an export route target value equal to an import route target value of the second spoke node.

15. A machine accessible medium as defined in claim 14, wherein the authorization database comprises a policy data structure to store a plurality of destination internet protocol addresses approved for communications via mesh network communication paths.

16. A machine accessible medium as defined in claim 14 having instructions stored thereon that, when executed, cause the machine to receive the route advertisement via a route reflector.

17. A machine accessible medium as defined in claim 14 having instructions stored thereon that, when executed, cause the machine to communicate the first destination internet protocol address to the authorization database and to receive a policy response from the authorization database indicating whether the first destination internet protocol address matches the second destination internet protocol address.

18. A machine accessible medium as defined in claim 14 having instructions stored thereon that, when executed, cause the machine to flood a network with the route advertisement including the first route target value equal to the import route target value of the second spoke node.

19. A machine accessible medium as defined in claim 14, wherein the second spoke node is prohibited from receiving the route advertisement without the addition of the export route target value to the route advertisement.

* * * * *